US007685326B2

(12) United States Patent
Takatsuji et al.

(10) Patent No.: US 7,685,326 B2
(45) Date of Patent: Mar. 23, 2010

(54) CONTROL DEVICE, AND CONTROLLED DEVICE

(75) Inventors: Ayako Takatsuji, Osaka (JP); Junji Yoshida, Osaka (JP); Mitsuteru Kataoka, Osaka (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 12/089,143

(22) PCT Filed: Sep. 21, 2006

(86) PCT No.: PCT/JP2006/318700

§ 371 (c)(1),
(2), (4) Date: Apr. 3, 2008

(87) PCT Pub. No.: WO2007/043296

PCT Pub. Date: Apr. 19, 2007

(65) Prior Publication Data

US 2009/0119418 A1 May 7, 2009

(30) Foreign Application Priority Data

Oct. 4, 2005 (JP) ............................ 2005-291755

(51) Int. Cl.
*G06F 3/00* (2006.01)
*G06F 9/00* (2006.01)

(52) U.S. Cl. ........................................................ 710/8

(58) Field of Classification Search ............... 710/8–10, 710/1–5, 15–19, 62, 72; 713/1–2; 340/825.06, 340/825.07; 369/19; 348/708; 370/380
See application file for complete search history.

(56) References Cited

U.S. PATENT DOCUMENTS 5,317,693 A * 5/1994 Cuenod et al. ................ 710/9

(Continued)

FOREIGN PATENT DOCUMENTS

CN 1507221 6/2004

(Continued)

OTHER PUBLICATIONS

International Search Report issued Oct. 17, 2006 in the International (PCT) Application of which the present application is the U.S. National Stage.

*Primary Examiner*—Christopher B Shin
(74) *Attorney, Agent, or Firm*—Wenderoth, Lind & Ponack, L.L.P.

(57) ABSTRACT

The invention provides a control device and a controlled device capable of reducing a management burden on a manufacturer by means of an easy-to-use method. A TV is a control device which controls a DVD recorder, including: a device ID acquisition unit which requests the DVD recorder to transmit a device ID, and receives the device ID from the DVD recorder; a device ID determination unit which determines whether or not the device ID is an initial value; a device ID generation unit which generates a new device ID in the case where the device ID is determined to be the initial value; a device ID update unit which requests the DVD recorder to update to the new device ID; a device ID/attribute information storing unit which stores the new device ID as the device ID of the DVD recorder; and a connected device control unit which controls the DVD recorder by using the device ID stored in the device ID/attribute information storing unit.

19 Claims, 9 Drawing Sheets

U.S. PATENT DOCUMENTS

| | | | | |
|---|---|---|---|---|
| 6,098,116 | A * | 8/2000 | Nixon et al. | 710/8 |
| 6,307,842 | B1 | 10/2001 | Nakata et al. | |
| 6,631,426 | B1 * | 10/2003 | Staats | 710/9 |
| 6,850,992 | B2 * | 2/2005 | Heinrich et al. | 710/3 |
| 2003/0177220 | A1 | 9/2003 | Ohara | |
| 2004/0073620 | A1 | 4/2004 | Roh et al. | |
| 2005/0021717 | A1 * | 1/2005 | Tomizawa | 709/223 |
| 2006/0047853 | A1 * | 3/2006 | Igarashi et al. | 709/245 |
| 2006/0095146 | A1 * | 5/2006 | Hesse et al. | 700/19 |

FOREIGN PATENT DOCUMENTS

| | | |
|---|---|---|
| EP | 1 343 297 | 9/2003 |
| JP | 5-63704 | 3/1993 |
| JP | 8-237285 | 9/1996 |
| JP | 10-164534 | 6/1998 |
| JP | 2003-169059 | 6/2003 |
| JP | 2003-264556 | 9/2003 |
| JP | 2004-135351 | 4/2004 |

* cited by examiner

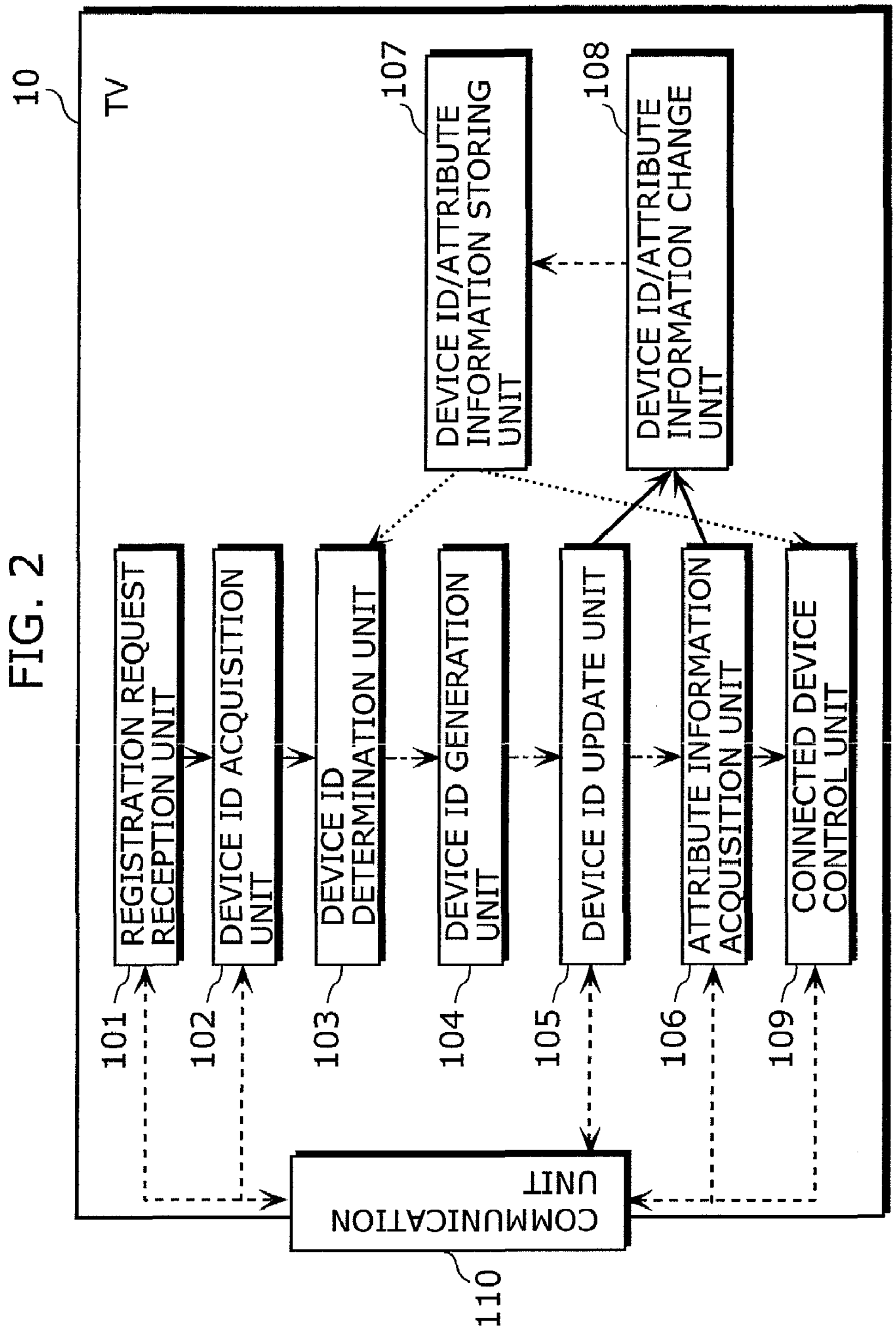
FIG. 2
10
TV
REGISTRATION REQUEST RECEPTION UNIT
101
DEVICE ID ACQUISITION UNIT
102
DEVICE ID DETERMINATION UNIT
103
DEVICE ID GENERATION UNIT
104
DEVICE ID UPDATE UNIT
105
ATTRIBUTE INFORMATION ACQUISITION UNIT
106
CONNECTED DEVICE CONTROL UNIT
109
DEVICE ID/ATTRIBUTE INFORMATION STORING UNIT
107
DEVICE ID/ATTRIBUTE INFORMATION CHANGE UNIT
108
COMMUNICATION UNIT
110
PROCESS FLOW
PROCESS FLOW (THAT OCCURS WHERE NECESSARY)
INPUT (REFERENCE) INFORMATION (DATA)
OUTPUT (REWRITE) INFORMATION (DATA)

| DEVICE ID | ATTRIBUTE INFORMATION |
|---|---|
| 1 | ○○○ |
| 2 | ××× |
| 3 | △△△ |

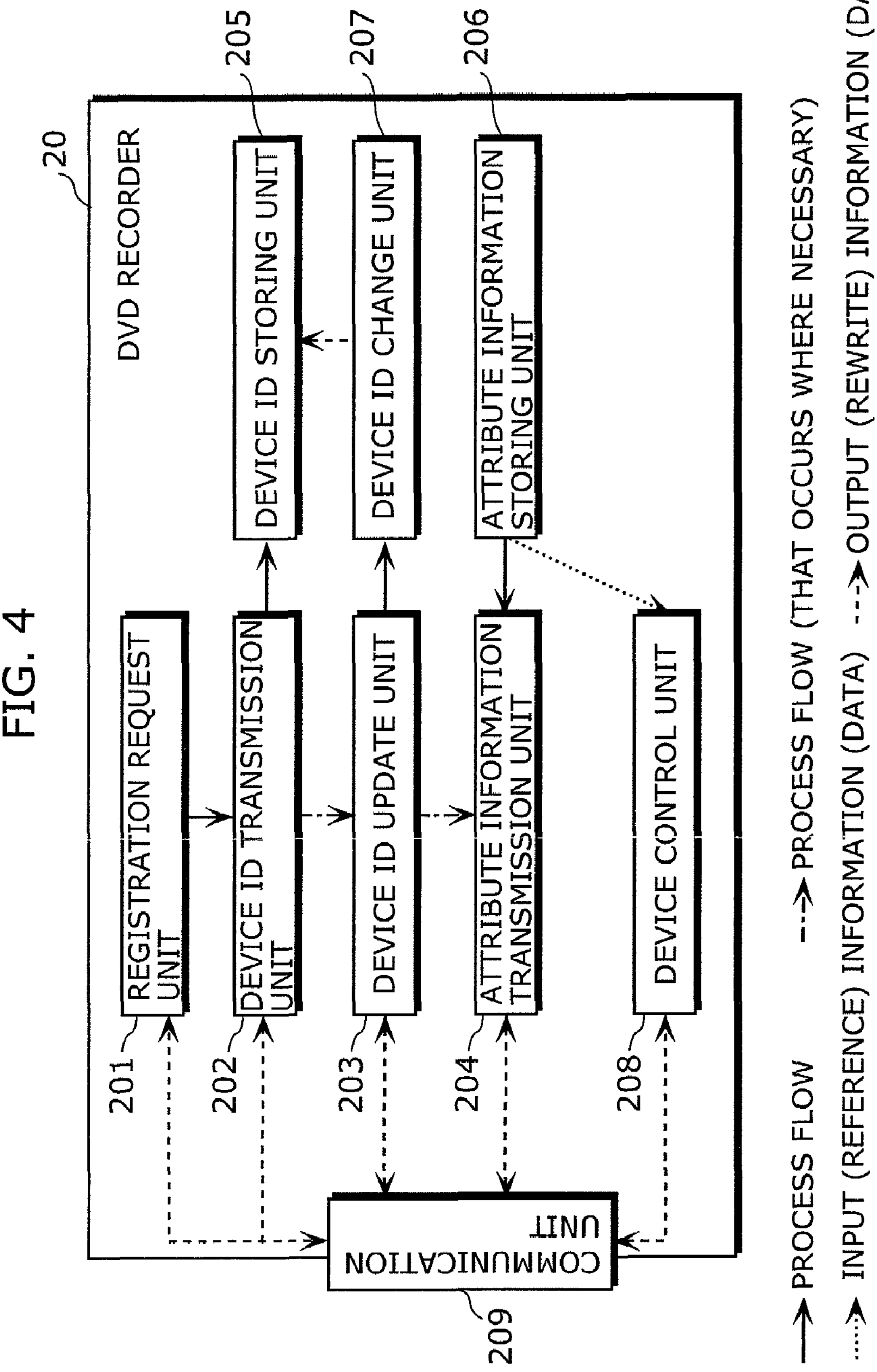
FIG. 4
20
DVD RECORDER
201
REGISTRATION REQUEST UNIT
202
DEVICE ID TRANSMISSION UNIT
203
DEVICE ID UPDATE UNIT
204
ATTRIBUTE INFORMATION TRANSMISSION UNIT
208
DEVICE CONTROL UNIT
205
DEVICE ID STORING UNIT
207
DEVICE ID CHANGE UNIT
206
ATTRIBUTE INFORMATION STORING UNIT
209
COMMUNICATION UNIT
PROCESS FLOW
PROCESS FLOW (THAT OCCURS WHERE NECESSARY)
INPUT (REFERENCE) INFORMATION (DATA)
OUTPUT (REWRITE) INFORMATION (DATA)

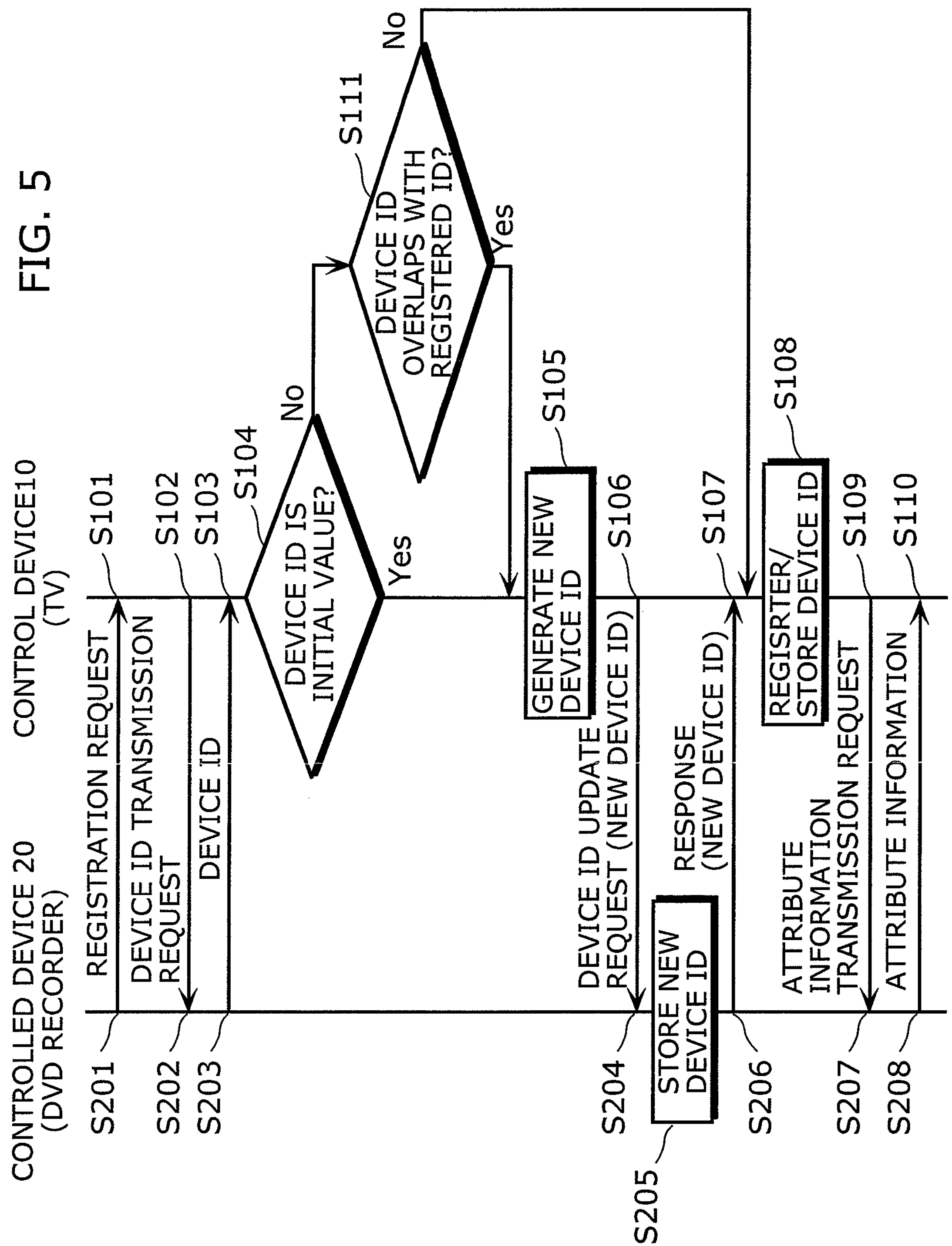
FIG. 5
CONTROLLED DEVICE 20 (DVD RECORDER)
CONTROL DEVICE10 (TV)
S201
S101
REGISTRATION REQUEST
S202
S102
DEVICE ID TRANSMISSION REQUEST
S203
S103
DEVICE ID
S104
DEVICE ID IS INITIAL VALUE?
Yes
No
S111
DEVICE ID OVERLAPS WITH REGISTERED ID?
Yes
No
S105
GENERATE NEW DEVICE ID
S106
S204
DEVICE ID UPDATE REQUEST (NEW DEVICE ID)
S205
STORE NEW DEVICE ID
S206
S107
RESPONSE (NEW DEVICE ID)
S108
REGISRTER/ STORE DEVICE ID
S207
S109
ATTRIBUTE INFORMATION TRANSMISSION REQUEST
S208
S110
ATTRIBUTE INFORMATION

CONTROL DEVICE, AND CONTROLLED DEVICE

BACKGROUND OF THE INVENTION

The present invention relates to a technique in which a control device controls a plurality of controlled devices, and in particular, to a technique in which a control device identifies a plurality of controlled devices.

In order for a control device to identify a plurality of controlled devices, it is typical to assign a unique ID such as EUI-64 to each controlled device. EUI-64 is a 64-bit-long ID which uniquely identifies a device, and the address system thereof is standardized by IEEE. Namely, in a 64-bit-long identifier, the high 24-bit part is called Organizationally Unique Identifier (OUI) or company_id, which is a number assigned uniquely to a manufacturer by IEEE. The remaining low 40-bit part is called an extension identifier, and IEEE is not involved in the assignment thereof. If a manufacturer to which OUI has been assigned observes a rule of assigning numbers without any, all devices having EUI-64 identifiers will have unique identifiers, respectively.

Further, a system in which a central management device assigns an identification code dynamically to an image forming device has also been proposed (for example, refer to Japanese Laid-Open Patent Application No. 2003-169059). The identification code is adapted to be switched depending on whether or not the central management device is connected to an outside management device.

However, assigning unique identifiers to all devices at the time of shipment places a heavy management burden on the manufacturer. This problem becomes prominent as the number of manufactured devices increases.

It is true that according to the system proposed in Japanese Laid-Open Patent Application No. 2003-169059, an identification code is assigned to a terminal device each time the image forming device is connected to the central management device, and so a problem of the management burden placed on the manufacturer being heavy is solved. However, if an identification code is assigned to a terminal device each time the image forming device is connected to the central management device, another problem is caused that the number of processing steps increases in both of the central management device and the image forming device.

SUMMARY OF THE INVENTION

The invention has been developed in view of such problems. Therefore an aspect of the present invention to provide a control device and a controlled device capable of reducing a management burden on a manufacturer by means of an easy-to-use method.

The control device according to an aspect of the invention is a control device which controls a controlled device, the control device including: an ID request unit which requests the controlled device to transmit a device ID; an ID reception unit which receives the device ID from the controlled device; a determination unit which determines whether or not the received device ID is an initial value; a generation unit which generates a new device ID in the case where the received device ID is determined to be the initial value; an update request unit which requests the controlled device to update the device ID to the new device ID; a storing unit which stores the new device ID as a device ID of the controlled device; and a control unit which controls the controlled device, using the device ID stored in the storing unit. Furthermore, the controlled device according to an aspect of the invention is a controlled device which is controlled by a control device, the controlled device including: a storing unit which stores a device ID with an initial value; an ID request reception unit which receives a transmission request for a device ID from the control device; an ID transmission unit which transmits the device ID stored in the storing unit to the control device in response to the transmission request; an update request reception unit which receives an update request for the device ID from the control device; and a change unit which changes the device ID stored in the storing unit in response to the update request. Thereby, even if a common initial value is set in a controlled device, a unique device ID is generated by a control device to which the controlled device is connected. Namely, it is only necessary to set an initial value as the device ID of a controlled device. This can reduce the management burden on the manufacturer.

In this case, in the case of determining that the device ID is not the initial value, the determination unit may further determine whether or not the device ID overlaps with any device ID stored in the storing unit, and in the case where the device ID is determined to be overlapping with any device ID stored in the storing unit, the generation unit may newly generate a device ID which is not the initial value and not stored in the storing unit. Thereby, even if the connecting mode is changed, it is possible to ensure the uniqueness of the device ID.

Further, the control device may further include: an attribute request unit which requests the controlled device to transmit attribute information; and an attribute reception unit which receives the attribute information from the controlled device, wherein the storing unit may store the attribute information received by associating the attribute information with the device ID, and the control unit may control the controlled device based on the attribute information stored. The controlled device may further include: a storing unit which stores attribute information of the controlled device; an attribute request reception unit which receives a transmission request for the attribute information from the control device; and an attribute transmission unit which transmits the attribute information stored in the storing unit to the control device in response to the transmission request. Thereby, since attribute information is transmitted from the controlled device to the control device, the control device can control the controlled device based on the attribute information.

Note that an aspect of the invention is not only capable of being realized as a control device or a controlled device as described above, but is also capable of being realized as a method in which a control device controls a controlled device by configuring the characteristic units provided to the devices as steps.

As is obvious from the description above, according to an aspect of the invention, even if a common initial value is set in a controlled device, a unique device ID is generated by a control device to which the controlled device is connected. Namely, it is only necessary to set an initial value as the device ID of a controlled device, and so it is possible to reduce the management burden on the manufacturer.

BRIEF DESCRIPTION OF DRAWINGS

FIG. 2 is a diagram showing the configuration of a TV.

FIG. 4 is a diagram showing the configuration of a DVD recorder.

FIG. 5 is a diagram showing operations of a TV and a DVD recorder.

NUMERICAL REFERENCES

Figure 1:
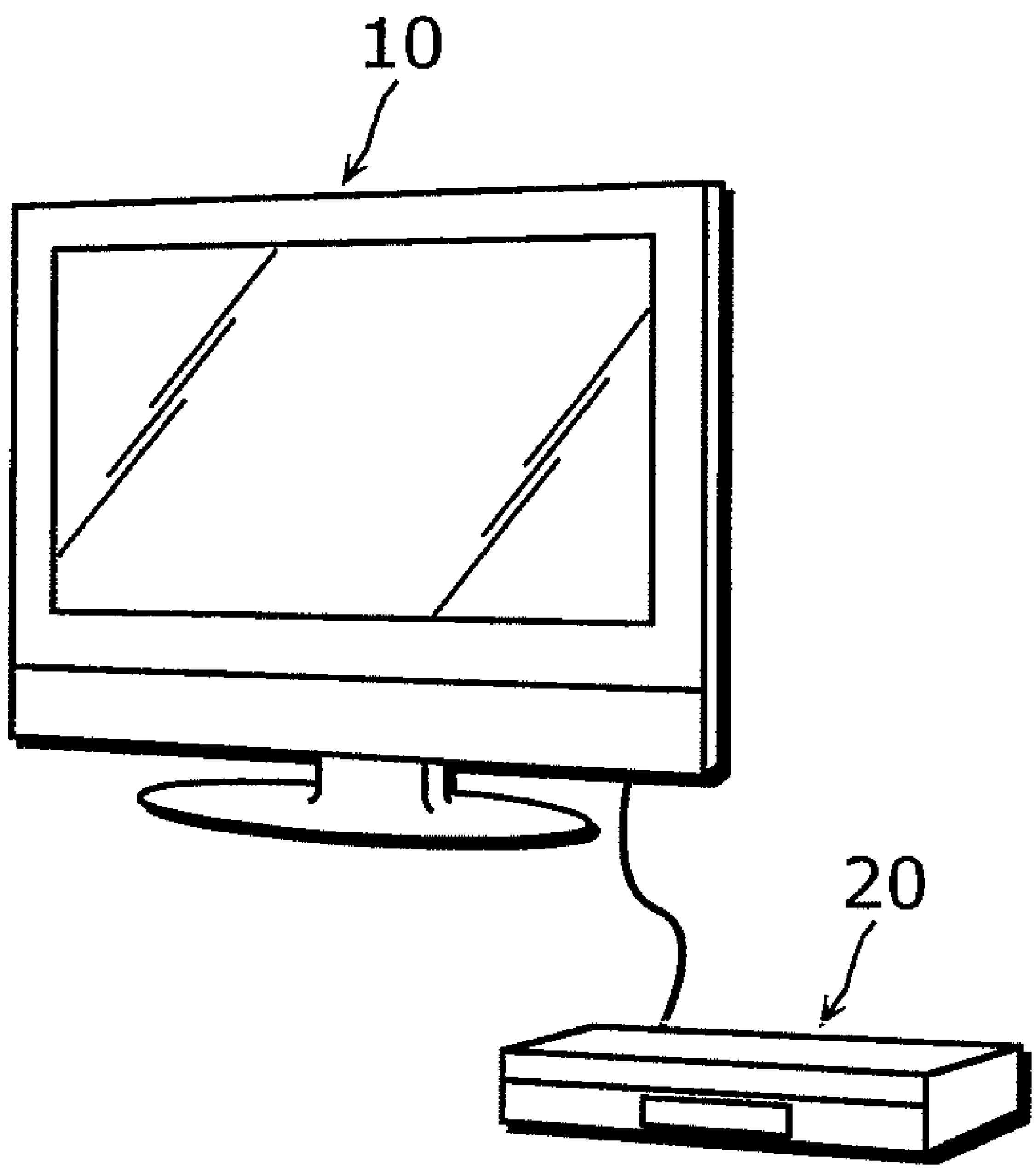
FIG. 1 is a diagram showing the overview of an embodiment of the present invention.

10 TV
11 TV
20 DVD recorder
21 DVD recorder
101 registration request reception unit
102 device ID acquisition unit
103 device ID determination unit
104 device ID generation unit
105 device ID update unit
106 attribute information acquisition unit
107 device ID/attribute information storing unit
108 device ID/attribute information change unit
109 connected device control unit
110 communication unit
201 registration request unit
202 device ID transmission unit
203 device ID update unit
204 attribute information transmission unit
205 device ID storing unit
206 attribute information storing unit
207 device ID change unit
208 device control unit
209 communication unit

DETAILED DESCRIPTION OF THE INVENTION

Hereinafter, an embodiment of the invention will be described in detail by using the drawings.

FIG. 1 is a diagram showing the overview of the embodiment. This shows a state where a TV 10 and a DVD recorder 20 are connected over a network. The TV 10 is an example of a control device to control the DVD recorder 20, which outputs contents. The DVD recorder 20 is an example of a controlled device to be controlled by the TV 10, which stores and distributes contents. It is possible to connect a plurality of controlled devices to the TV 10.

FIG. 2 is a diagram showing the configuration of the TV 10. The TV 10 includes, as functions, a registration request reception unit 101, a device ID acquisition unit 102, a device ID determination unit 103, a device ID generation unit 104, a device ID update unit 105, an attribute information acquisition unit 106, a device ID/attribute information storing unit 107, a device ID/attribute information change unit 108, a connected device control unit 109, and a communication unit 110.

The communication unit 110 performs bidirectional communications with the DVD recorder 20 through a wired or wireless link. Any communication interface is acceptable as long as it supports the communication system.

The device ID/attribute information storing unit 107 stores the device ID of the DVD recorder 20 and attribute information of the DVD recorder 20.

The registration request reception unit 101 receives a registration request from the DVD recorder 20.

The device ID acquisition unit 102 acquires a device ID from the DVD recorder 20. The device ID acquisition unit 102 includes an ID request unit which requests the DVD recorder 20 to transmit a device ID, and an ID reception unit which receives a device ID from the DVD recorder 20.

The device ID determination unit 103 determines the value of a device ID acquired by the device ID acquisition unit 102. Specifically, it determines whether or not the device ID acquired by the device ID acquisition unit 102 is an initial value such as 0 for example, and in the case where the device ID is not the initial value, it further determines whether or not the device ID overlaps with any device ID stored in the device ID/attribute information storing unit 107.

In the case where the device ID acquired by the device ID acquisition unit 102 is the initial value or it overlaps with any device ID stored in the device ID/attribute information storing unit 107, the device ID generation unit 104 generates a new device ID which is not stored in the device ID/attribute information storing unit 107.

The device ID update unit 105 updates the device ID of the DVD recorder 20 in the case where a new device ID is generated by the device ID generation unit 104. Specifically, it transmits an update request including the new device ID to the DVD recorder 20, and receives the response from the DVD recorder 20. Then, it notifies the device ID/attribute information change unit 108 of the device ID included in the response.

The attribute information acquisition unit 106 acquires attribute information from the DVD recorder 20. The attribute information acquisition unit 106 includes an attribute request unit which requests the DVD recorder 20 to transmit attribute information, and an attribute receiving unit which receives attribute information from the DVD recorder 20.

The device ID/attribute information change unit 108 changes a device ID and attribute information stored in the device ID/attribute information storing unit 107. Specifically, it causes the device ID/attribute information storing unit 107 to store a device ID received by the device ID update unit 105 and attribute information acquired by the attribute information acquisition unit 106.

The connected device control unit 109 controls a device connected to the TV 10. Specifically, it transmits, to the DVD recorder 20, a control request such as the change of setting and an operation instruction. A control request is generated by, for example, a user instruction to the TV 10. Namely, an operation screen for instructing transmission of a control request is displayed on the TV 10. The operation screen is generated based on attribute information stored in the device ID/attribute information storing unit 107. Accordingly, it is possible to display only instructions related to operations which can be performed by a device, which is the controlled object, on the operation screen (or only instructions related to operations which can be performed are issued to a device which is the controlled object). This provides an easy-to-use control function with reduced waste.

Figure 3:
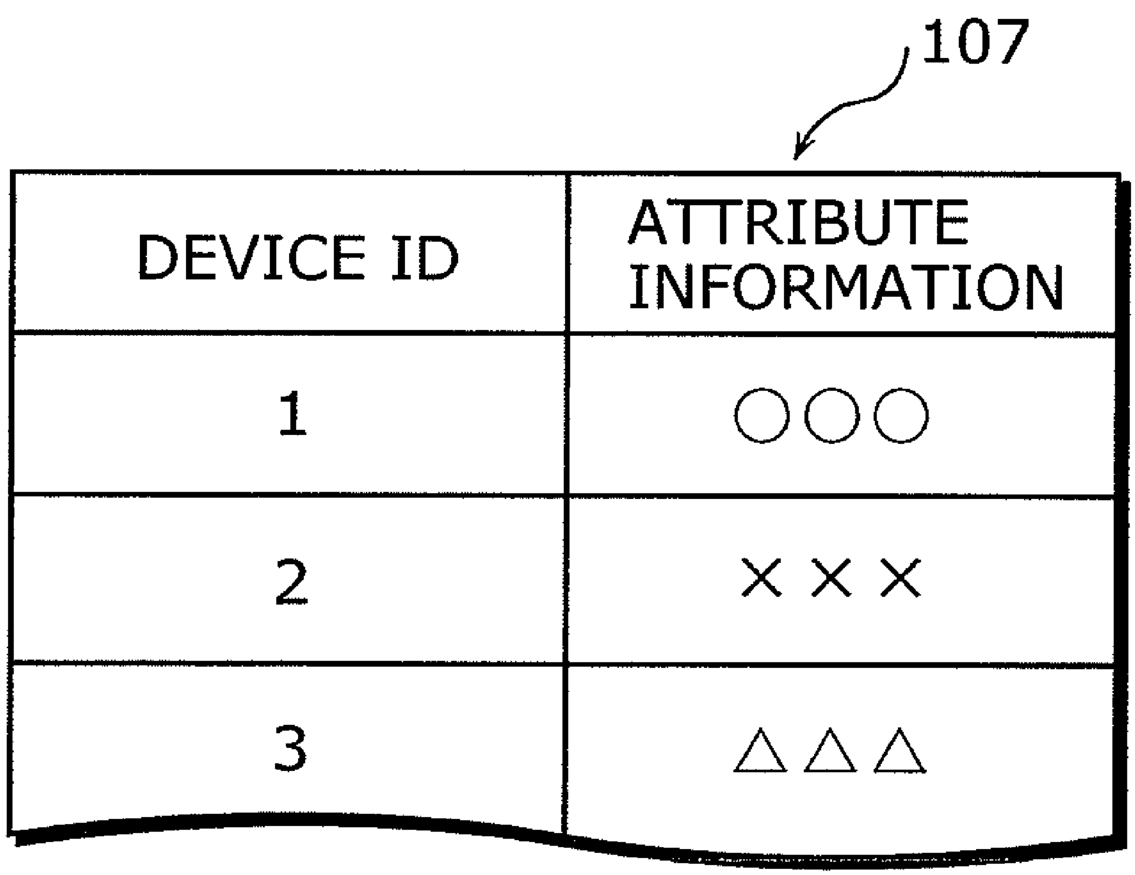
FIG. 3 is diagram showing an example of the internal configuration of a device ID/attribute information storing unit.

FIG. 3 is a diagram showing an example of the internal configuration of the device ID/attribute information storing unit 107. As shown in this FIG. 3, the device ID/attribute information storing unit 107 stores each of the device IDs and each attribute information in association with each other. Attribute information is information relating to functions and settings provided in the DVD recorder 20 such as types of tuners, recording modes, time required for activation held by the DVD recorder 20. By the TV 10 storing attribute information, it becomes possible for the TV 10 to effectively control the DVD recorder 20. Note that at a point in time when a user purchases the TV 10, the device ID/attribute information storing unit 107 stores neither device ID nor attribute information. As described below, when the DVD recorder 20 is connected to the TV 10, the TV 10 stores a device ID and attribute information thereof.

FIG. 4 is a diagram showing the configuration of the DVD recorder 20.

The DVD recorder 20 includes a registration request unit 201, a device ID transmission unit 202, a device ID update unit 203, an attribute information transmission unit 204, a device ID storing unit 205, an attribute information storing unit 206, a device ID change unit 207, a device control unit 208, and a communication unit 209.

The communication unit 209 performs bidirectional communications with the TV 10 through a wired or wireless link. Any communication interface is acceptable as long as it supports the communication system.

The device ID storing unit 205 stores the device ID of the DVD recorder 20. The device ID when the user purchases the DVD recorder 20 is the initial value. Although the type of a value adopted as the initial value is not limited, the following description is given, using "0" as an example.

The attribute information storing unit 206 stores the attribute information of the DVD recorder 20.

The registration request unit 201 transmits a registration request to the TV 10. The reason for transmitting a registration request to the TV 10 is to put the DVD recorder 20 under management of the TV 10. It is not necessary to transmit a registration request each time the DVD recorder 20 is connected to the TV 10. It is only necessary to transmit a registration request when a prescribed condition is satisfied, such as when a change of connecting mode is detected.

The device ID transmission unit 202 transmits the device ID of the DVD recorder 20 to the TV 10. Specifically, when receiving a transmission request for the device ID from the TV 10, it transmits the device ID stored in the device ID storing unit 205 to the TV 10.

The device ID update unit 203 updates the device ID of the DVD recorder 20. Specifically, when receiving a device ID update request including a new device ID from the TV 10, it transmits a response including the new device ID to the TV 10, and notifies the device ID change unit 207 of the new device ID.

The device ID change unit 207 causes the device ID storing unit 205 to store the device ID received by the device ID update unit 203.

When the attribute information transmission unit 204 receives a transmission request for attribute information from the TV 10, it transmits the attribute information stored in the attribute information storing unit 206 to the TV 10.

When the device control unit 208 receives a setting change request or an operation instruction request from the TV 10, it performs processing corresponding to the request.

(Initial Setting Example)

Figure 6A:
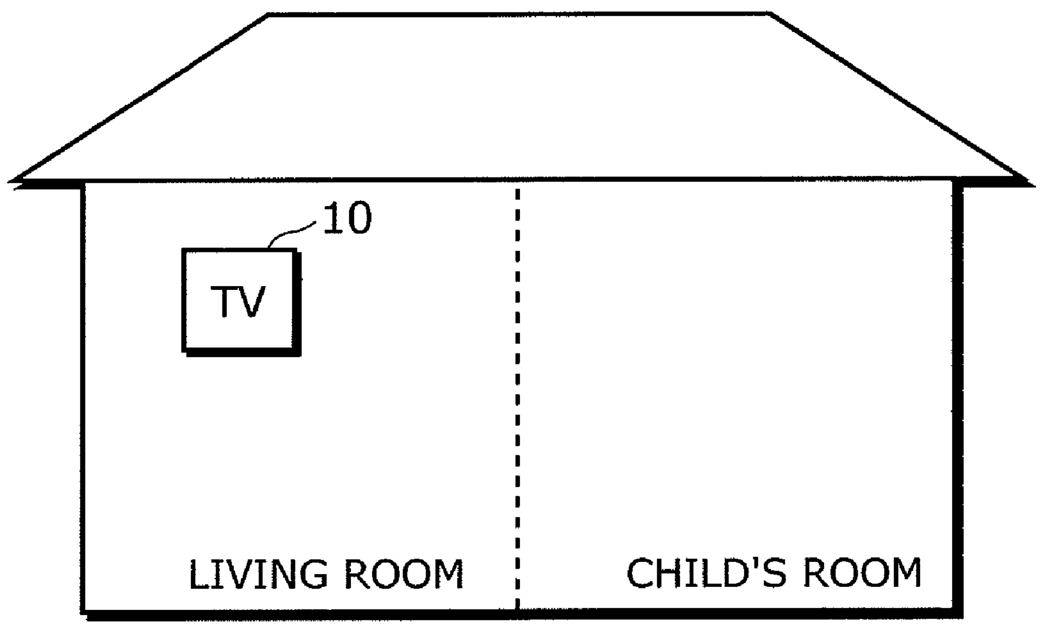
FIGS. 6A and 6B are diagrams showing a connecting mode of a TV and a DVD recorder.
Figure 6B:
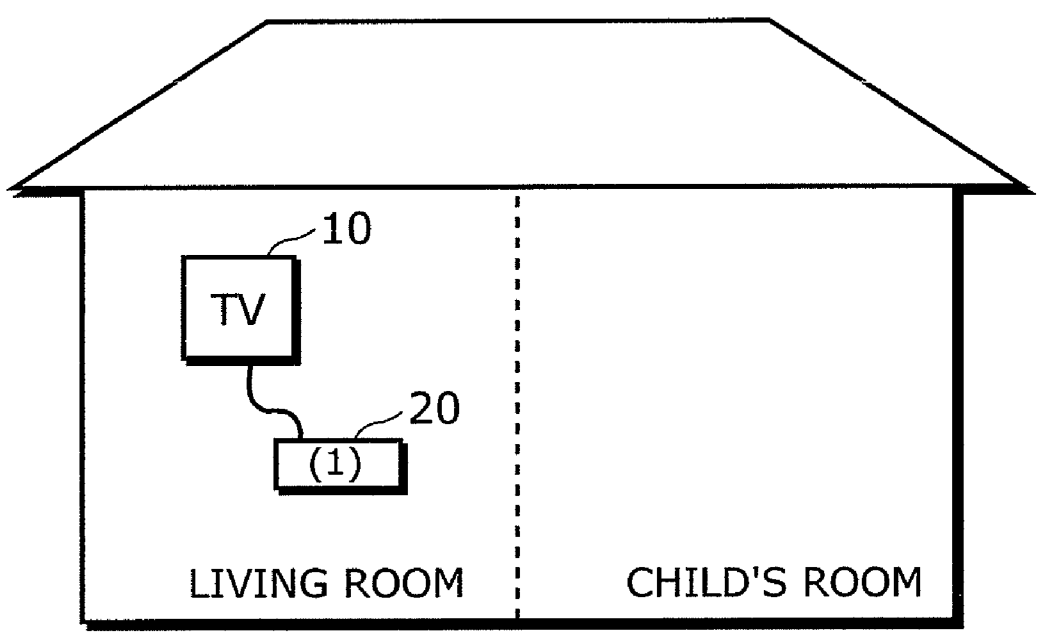

FIG. 5 is a diagram showing operations of the TV 10 and the DVD recorder 20. FIGS. 6A and 6B are diagrams showing a connecting mode of the TV 10 and the DVD recorder 20. In this case, it is assumed that the TV 10 is placed in a living room as shown in FIG. 6A, and a description will be given for the operation when the DVD recorder 20 is connected to the TV 10, as shown in FIG. 6B. Note that it is assumed that the TV 10 and the DVD recorder 20 have just been purchased by the user.

First, operation of the TV 10 will be described.

When the registration request reception unit 101 receives a registration request from the DVD recorder 20 (S101), it notifies the device ID acquisition unit 102 of the fact.

The device ID acquisition unit 102 transmits a device ID transmission request to the DVD recorder 20 (S102). Then, when receiving the device ID from the DVD recorder 20 (S103), it notifies the device ID determination unit 103 of the device ID.

The device ID determination unit 103 determines whether or not the device ID acquired by the device ID acquisition unit 102 is the initial value (S104). In this case, the device ID acquired by the device ID acquisition unit 102 is 0, that is, the initial value, and so such fact is notified to the device ID generation unit 104.

The device ID generation unit 104 generates a new device ID which is not the initial value and is not stored in the device ID/attribute information storing unit 107 (S105), and notifies the device ID update unit 105 of the new device ID. In this case, since the device ID/attribute information storing unit 107 does not store any device ID, the new device ID "1" is notified.

The device ID update unit 105 transmits a device ID update request including the new device ID "1" to the DVD recorder 20 (S106). Then, when receiving a response to the device ID update request including the device ID "1" from the DVD recorder 20 (S107), it notifies the device ID/attribute information change unit 108 of the device ID "1" included in the response.

The device ID/attribute information change unit 108 causes the device ID/attribute information storing unit 107 to store the device ID "1" (S108). Further, it instructs the attribute information acquisition unit 106 to acquire attribute information.

The attribute information acquisition unit 106 transmits an attribute information transmission request to the DVD recorder 20 (S109). Then, when receiving attribute information from the DVD recorder 20 (S110), it notifies the device ID/attribute information change unit 108 of the attribute information.

The device ID/attribute information change unit 108 causes the device ID/attribute information storing unit 107 to store the attribute information notified. Thereby, the device ID "1" and the attribute information of the DVD recorder 20 are stored in the device ID/attribute information storing unit 107 in association with each other.

Thereafter, the DVD recorder 20 is controlled by the connected device control unit 109.

Next, operation of the DVD recorder 20 will be described.

The registration request unit 201 transmits a registration request to the TV 10 (S201).

When the device ID transmission unit 202 receives a device ID transmission request from the TV 10 (S202), it transmits the device ID stored in the device ID storing unit 205 to the TV 10 (S203). In this case, since the DVD recorder 20 has just been purchased by the user, the device ID "0", which is the initial value, is transmitted to the TV 10.

When the device ID update unit 203 receives a device ID update request including a new device ID from the TV 10 (S204), it notifies the device ID change unit 207 of the new device ID included in the device ID update request.

When the device ID change unit 207 causes the device ID storing unit 205 to store the new device ID (S205), it notifies the device ID update unit 203 of the fact.

The device ID update unit 203 transmits the device ID stored in the device ID storing unit 205 to the TV 10 (S206). Since the new device ID is "1" in this case, the device ID "0" stored in the device ID storing unit 205 is updated to "1", and the device ID "1" is transmitted to the TV 10.

When the attribute information transmission unit 204 receives an attribute information transmission request from the TV 10 (S207), it transmits the attribute information stored in the attribute information storing unit 206 to the TV 10 (S208).

As described above, in the DVD recorder 20 just purchased by the user, the initial value of the device ID "0" is set by the manufacturer. When the DVD recorder 20 is connected to the TV 10 placed in the living room, a new device ID "1", which is different from the initial value, is generated by the TV 10, and the device ID of the DVD recorder 20 is updated to the new device ID "1". Further, the attribute information of the DVD recorder 20 is stored by the TV 10 in association with the new device ID "1".

Figure 7A:
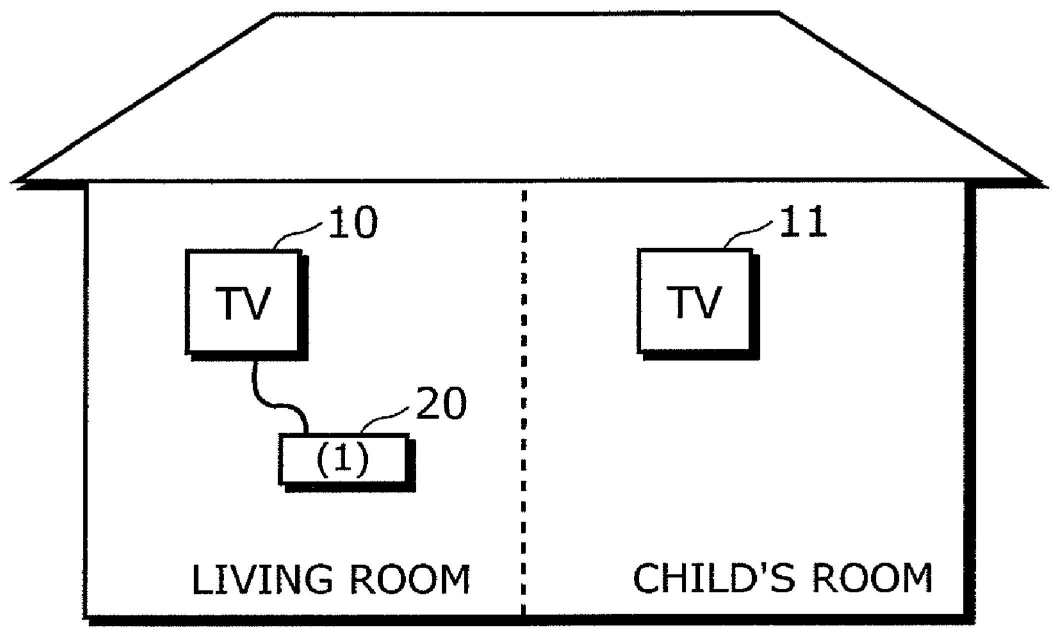
FIGS. 7A and 7B are diagrams showing a connecting mode of a TV and a DVD recorder.
Figure 7B:
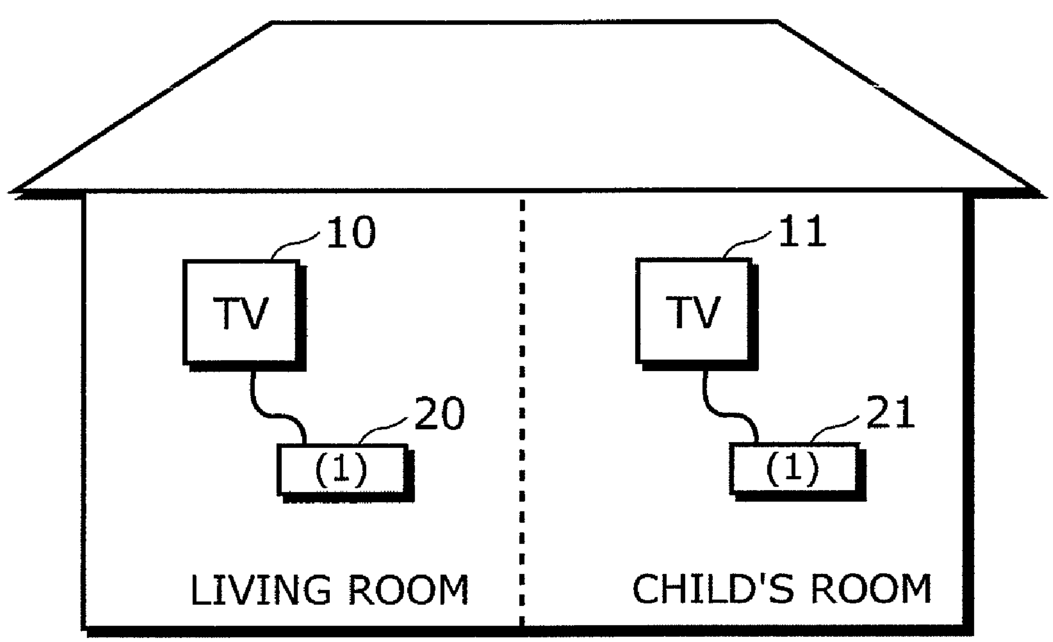

FIGS. 7A and 7B are diagrams showing a connecting mode of a TV 11 and a DVD recorder 21. In this case, it is assumed that another TV 11, which has just been purchased, is placed in a child's room, as shown in FIG. 7A. As shown in FIG. 7B, it is assumed that a DVD recorder 21, which has just been purchased, is connected to the TV 11.

As described above, in the DVD recorder 21 just having been purchased, the initial value of the device ID "0" is set by the manufacturer. When the DVD recorder 21 is connected to the TV 11 placed in the child's room, a new device ID "1", which is different from the initial value, is generated by the TV 11, and the device ID of the DVD recorder 21 is updated to the new device ID "1". Further, the attribute information of the DVD recorder 21 is stored into the TV 11 in association with the new device ID "1". Since the operations of the TV 11 and the DVD recorder 21 are the same as the operations of the TV 10 and the DVD recorder 20 described above, a detailed description thereof is omitted here.

(Connecting Mode Change Example)

Figure 8A:
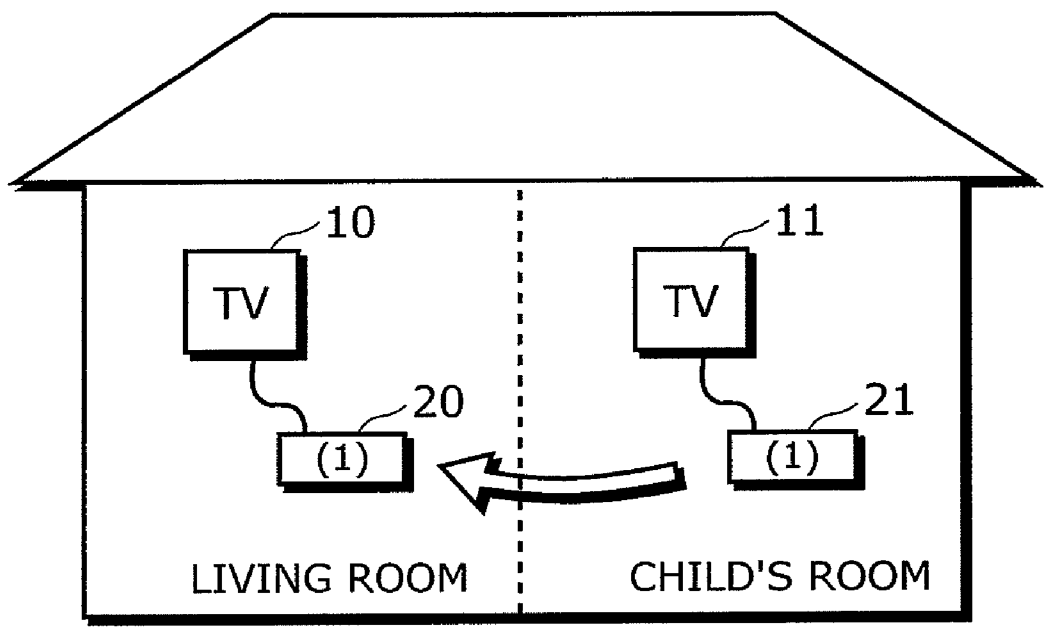
FIGS. 8A and 8B are diagrams showing a situation of changing a connecting mode of a TV and a DVD recorder.
Figure 8B:
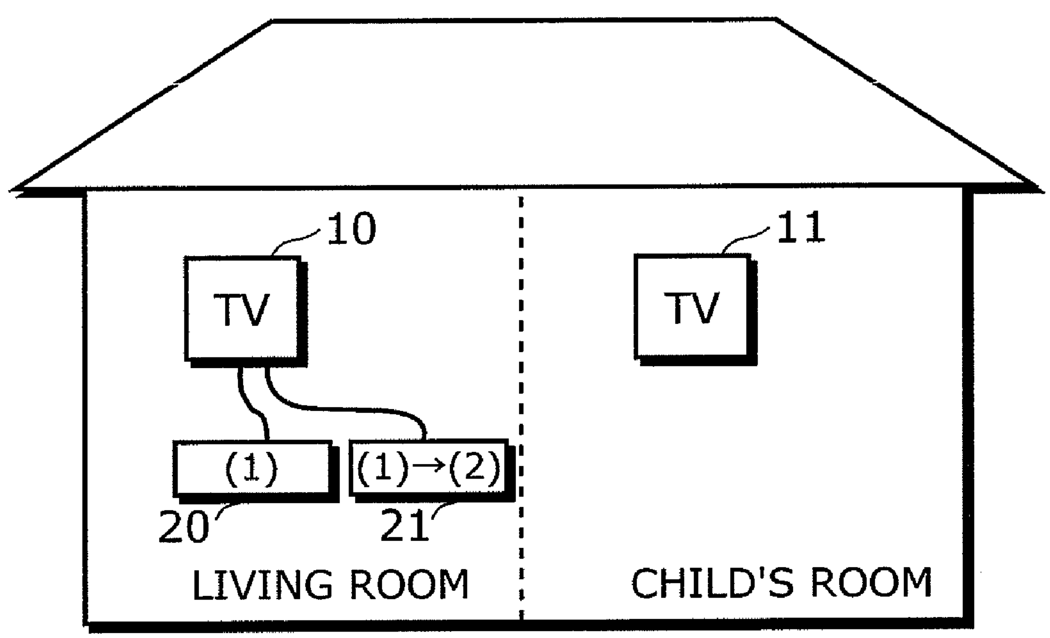

FIGS. 8A and 8B are diagrams showing a situation of changing the connecting mode of the TV and the DVD recorder. In this case, the DVD recorder 21, having been connected to the TV 11 in the child's room as shown in FIG. 8A, is connected to the TV 10 in the living room as shown in FIG. 8B.

The device ID/attribute information storing unit 107 of the TV 10 placed in the living room already stores the device ID "1" and the attribute information of the DVD recorder 20, to which it has been connected. On the other hand, the device ID storing unit 205 of the DVD recorder 21 moved from the child's room to the living room stores the new device ID "1" generated by the TV 11. Hereinafter, operations of the TV 10 and the DVD recorder 21 will be described by using FIG. 8 and FIG. 5.

First, operation of the TV 10 will be described.

When the registration request reception unit 101 receives a registration request from the DVD recorder 21 (S101), it notifies the device ID acquisition unit 102 of the fact.

The device ID acquisition unit 102 transmits a device ID transmission request to the DVD recorder 21 (S102). Then, when receiving a device ID from the DVD recorder 21 (S103), it notifies the device ID determination unit 103 of the device ID.

The device ID determination unit 103 determines whether or not the device ID acquired by the device ID acquisition unit 102 is the initial value "0" (S104). In this case, the device ID acquired by the device ID acquisition unit 102 is a new device ID "1" generated by the TV 11, and is not the initial value "0", and so the device ID determination unit 103 determines whether or not the device ID "1" overlaps with any device ID stored in the device ID/attribute information storing unit 107 (S111).

In this case, in the device ID/attribute information storing unit 107, the device ID "1" of the DVD recorder 20 is stored. Therefore, the device ID determination unit 103 notifies the device ID generation unit 104 of the fact that the device ID "1" acquired by the device ID acquisition unit 102 overlaps with the device ID "1" stored in the device ID/attribute information storing unit 107.

The device ID generation unit 104 generates a new device ID which is not the initial ID and is not stored in the device ID/attribute information storing unit 107 (S105), and notifies the device ID update unit 105 of the new device ID. In this case, since the device ID/attribute information storing unit 107 stores the device ID "1", a new device ID "2" is notified.

The device ID update unit 105 transmits a device ID update request including the new device ID "2" to the DVD recorder 21 (S106). Then, when receiving a response to the device ID update request including the device ID "2" from the DVD recorder 21 (S107), it notifies the device ID/attribute information change unit 108 of the device ID "2" included in the response.

The device ID/attribute information change unit 108 causes the device ID/attribute information storing unit 107 to store the device ID "2" (S108). Further, it instructs the attribute information acquisition unit 106 to acquire attribute information.

The attribute information acquisition unit 106 transmits an attribute information transmission request to the DVD recorder 21 (S109). Then, when receiving attribute information from the DVD recorder 21 (S110), it notifies the device ID/attribute information change unit 108 of the attribute information.

The device ID/attribute information change unit 108 causes the device ID/attribute information storing unit 107 to store the attribute information notified. Thereby, in addition to the device ID "1" of the DVD recorder 20 and the attribute information thereof, the device ID "2" of the DVD recorder 21 and the attribute information thereof are stored in the device ID/attribute information storing unit 107.

Thereafter, the DVD recorders 20 and 21 are controlled by the connected device control unit 109.

Next, operation of the DVD recorder 21 will be described.

The registration request unit 201 transmits a registration request to the TV 10 (S201).

When the device ID transmission unit 202 receives a device ID transmission request from the TV 10 (S202), it transmits the device ID stored in the device ID storing unit 205 to the TV 10 (S203). In this case, since the new device ID "1" generated by the TV 11 is stored in the device ID storing unit 205, the device ID "1" is transmitted to the TV 10.

When the device ID update unit 203 receives a device ID update request including the new device ID from the TV 10 (S204), it notifies the device ID change unit 207 of the new device ID included in the device ID update request.

The device ID change unit 207 causes the device ID storing unit 205 to store the new device ID (S205), and then notifies the device ID update unit 203 of the fact.

The device ID update unit 203 transmits the device ID stored in the device ID storing unit 205 to the TV 10 (S206). In this case, since a new device ID is "2", the device ID "1" stored in the device ID storing unit 205 is updated to "2", and the device ID "2" is to be transmitted to the TV 10.

When the attribute information transmission unit 204 receives an attribute information transmission request from the TV 10 (S207), it transmits the attribute information stored in the attribute information storing unit 206 to the TV 10 (S208).

As described above, in the DVD recorder 21 moved from the child's room to the living room, the new device ID "1" generated by the TV 11 is set. When the DVD recorder 21 is connected to the TV 10 placed in the living room, the new device ID "2", which is not the initial value and does not overlap with the device ID of an other DVD recorder, is generated by the TV 10, and the device ID of the DVD recorder 21 is updated to the new device ID "2". Further, the attribute information of the DVD recorder 21 is stored into the TV 10 in association with the new device ID "2".

(Another Connecting Mode Change Example)

Figure 9A:
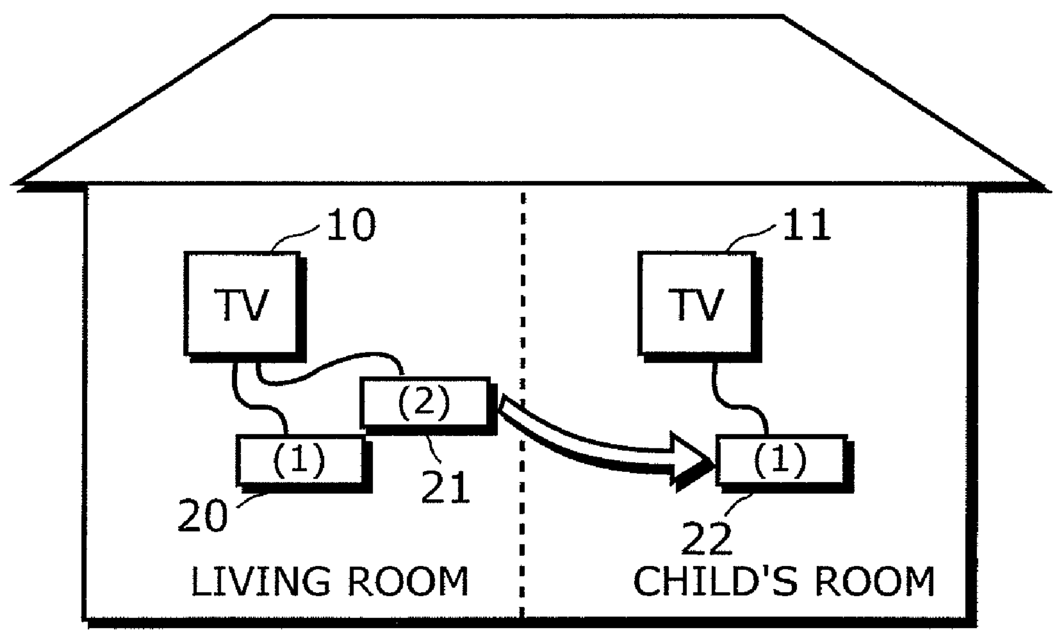
FIGS. 9A and 9B are diagrams showing another situation of changing a connecting mode of a TV and a DVD recorder.
Figure 9B:
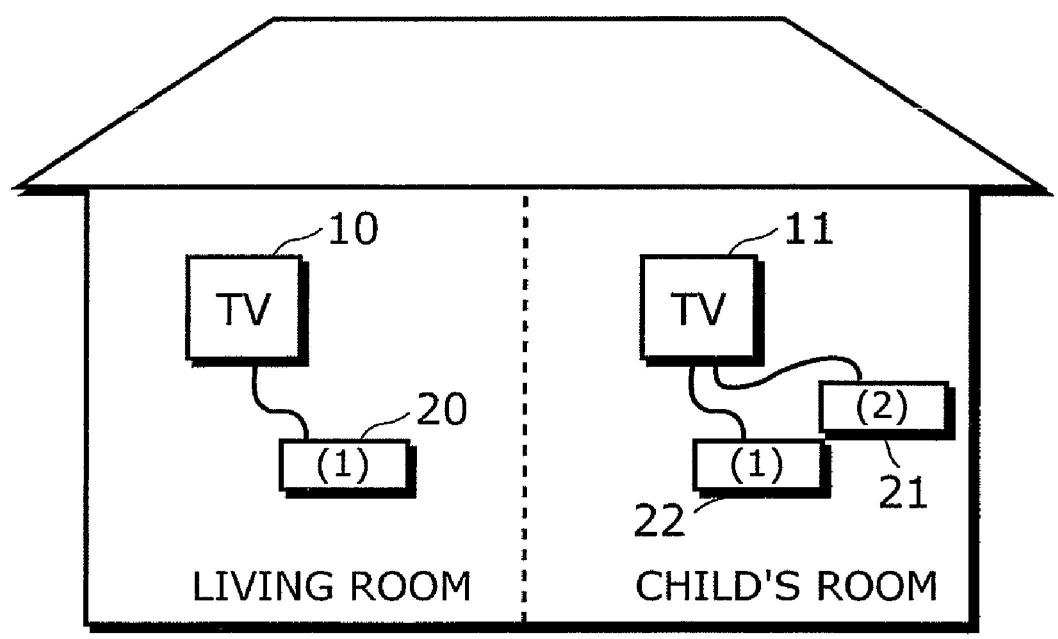

FIGS. 9A and 9B are diagrams showing another situation of changing the connecting mode of the TV and the DVD recorder. In this case, the DVD recorder 21 moved from the child's room to the living room, as shown in FIG. 9A, is returned to the child's room and reconnected to the TV 11 as shown in FIG. 9B. At this time, however, it is assumed that another DVD recorder 22 is already connected to the TV 11.

The device ID/attribute information storing unit 107 of the TV 11 placed in the child's room stores the device ID "1" of the DVD recorder 22 already connected and the attribute information thereof. On the other hand, the device ID storing unit 205 of the DVD recorder 21 returned from the living room to the child's room stores the new device ID "2" generated by the TV 10. Hereinafter, operations of the TV 11 and the DVD recorder 21 will be described by using FIGS. 9 and 5.

First, operation of the TV 11 will be described.

When the registration request reception unit 101 receives a registration request from the DVD recorder 21 (S101), it notifies the device ID acquisition unit 102 of the fact.

The device ID acquisition unit 102 transmits a device ID transmission request to the DVD recorder 21 (S102). Then, when receiving the device ID from the DVD recorder 21 (S103), it notifies the device ID determination unit 103 of the device ID.

The device ID determination unit 103 determines whether or not the device ID acquired by the device ID acquisition unit 102 is the initial value "0" (S104). In this case, the device ID acquired by the device ID acquisition unit 102 is the new ID "2" generated by the TV 11, and is not the initial value "0". Therefore, the device ID determination unit 103 determines whether or not the device ID "2" overlaps with any device ID stored in the device ID/attribute information storing unit 107 (S111).

In this case, in the device ID/attribute information storing unit 107, the device ID "1" of the DVD recorder 22 is stored, but the device ID "1" does not overlap with the device ID "2" acquired by the device ID acquisition unit 102. Therefore, the device ID determination unit 103 instructs the attribute information acquisition unit 106 to acquire attribute information.

The attribute information acquisition unit 106 transmits an attribute information transmission request to the DVD recorder 21 (S109). Then, when receiving attribute information from the DVD recorder 21 (S110), it notifies the device ID/attribute information change unit 108 of the attribute information.

The device ID/attribute information change unit 108 causes the device ID/attribute information storing unit 107 to store the attribute information notified. Thereby, in addition to the device ID "1" of the DVD recorder 22 and the attribute information thereof, the device ID "2" of the DVD recorder 21 and the attribute information thereof are also stored in the device ID/attribute information storing unit 107.

Thereafter, the DVD recorders 21 and 22 are controlled by the connected device control unit 109.

Next, operation of the DVD recorder 21 will be described.

The registration request unit 201 transmits a registration request to the TV 11(S201).

When the device ID transmission unit 202 receives a device ID transmission request from the TV 11 (S202), it transmits the device ID stored in the device ID storing unit 205 to the TV 11 (S203). In this case, since the device ID "2" generated by the TV 10 is stored in the device ID storing unit 205, the device ID "2" is transmitted to the TV 11.

When the attribute information transmission unit 204 receives an attribute information transmission request from the TV 11 (S207), it transmits attribute information stored in the attribute information storing unit 206 to the TV 11 (S208).

As described above, in the DVD recorder 21 returned from the living room to the child's room, the new device ID "2" generated by the TV 10 is set. When the DVD recorder 21 is reconnected to the TV 10 placed in the child's room, the device ID "2" of the DVD recorder 21 and the attribute information thereof are stored in the TV 11, without changing the device ID "2".

As described above, according to the embodiment, even if the common initial value "0" is set in a DVD recorder, a unique device ID is generated by a TV to which the DVD recorder is connected. That is, as the device ID of the DVD recorder, it is only necessary to set the initial value "0". This can reduce the management burden on the manufacturer.

Further, the timing at which the DVD recorder according to the embodiment transmits a registration request to the TV is only when the prescribed condition is met, as described above. Namely, the DVD recorder does not need to transmit a registration request each time it is connected to the TV, and the TV does not need to acquire attribute information each time the DVD recorder is connected. Thereby, it is possible to prevent a problem of an increase in the number of processing steps both in the TV and the DVD recorder, and to reduce the load on the network. Of course, when the prescribed condition is met, a registration request is transmitted from the DVD recorder to the TV and a new device ID is generated. Therefore, it is possible to keep unique property of the device ID of each DVD recorder connected to the TV.

Note that, in the description above, although it has been described that the TV generates a new ID when a device ID acquired from the DVD recorder is the initial value, or when it overlaps with any device ID stored in the TV, a condition to generate a new device ID is not limited to this. Namely, the TV may generate a new device ID when a device ID acquired from the DVD recorder is the initial value or when it overlaps with a device ID of another DVD recorder connected to the TV at that point in time.

Further, in the description above, although a TV is described as a control device and a DVD recorder is described as a controlled device exemplarily, the invention is not limited to this. For example, a personal computer may be adopted as a control device, and various household appliances may be adopted as controlled devices. In other words, as long as conditions that a control device is a device which controls a controlled device and a controlled device is a device controlled by a control device are met, they can be applicable to the invention.

INDUSTRIAL APPLICABILITY

The invention can be applied to a TV, a DVD recorder and the like, a management burden of which on the manufacturer must be reduced by means of an easy-to-use method.

The invention claimed is:

1. A control device which controls a controlled device via a network, said control device comprising:

an ID request unit operable to request the controlled device to transmit a device ID;

an ID reception unit operable to receive the device ID from the controlled device;

a determination unit operable to determine whether or not the received device ID is an initial value;

a generation unit operable to generate a new device ID in the case where the received device ID is determined to be the initial value;

an update request unit operable to request the controlled device to update the device ID to the new device ID;

a storing unit operable to store the new device ID as a device ID of the controlled device; and a control unit operable to control the controlled device, using the device ID stored in said storing unit, wherein said determination unit is further operable to determine whether or not the device ID overlaps with any device ID stored in said storing unit when said determination unit determines that the device ID is not the initial value, said generation unit is operable to newly generate a device ID which is not the initial value and not stored in said storing unit when the device ID is determined to be overlapping with any device ID stored in said storing unit, the device ID does not include an IP address, and the network is a network in which each device does not have a device-unique address.

2. The control device according to claim 1, wherein said control device is a television and the controlled device is a digital video disc player/recorder.

3. The control device according to claim 1, wherein information transmitted and received between said control device and the controlled device is transmitted and received wirelessly.

4. The control device according to claim 1, further comprising:

an attribute request unit operable to request the controlled device to transmit attribute information; and an attribute reception unit operable to receive the attribute information from the controlled device;

wherein said storing unit is operable to store the attribute information received by associating the attribute information with the device ID, and said control unit is operable to control the controlled device based on the attribute information stored.

5. The control device according to claim 4, wherein the attribute information is information related to functions and settings provided in the controlled device which include types of tuners, recording modes, and time required for activation.

6. A controlled device which is controlled by a control device via a network, said controlled device comprising:

a storing unit operable to store a device ID with an initial value;

an ID request reception unit operable to receive a transmission request for a device ID from the control device;

an ID transmission unit operable to transmit the device ID stored in said storing unit to the control device in response to the transmission request;

an update request reception unit operable to receive an update request for the device ID from the control device;

a change unit operable to change the device ID stored in said storing unit in response to the update request;

a storing unit operable to store attribute information of said controlled device;

an attribute request reception unit operable to receive a transmission request for the attribute information from the control device; and an attribute transmission unit operable to transmit the attribute information stored in said storing unit to the control device in response to the transmission request, wherein the device ID does not include an IP address, and the network is a network in which each device does not have a device-unique address.

7. The controlled device according to claim 6, wherein said controlled device is a digital video disc player/recorder and the control device is a television.

8. The controlled device according to claim 6, wherein the attribute information is information related to functions and settings provided in the controlled device which include types of tuners, recording modes, and time required for activation.

9. The controlled device according to claim 6, wherein information transmitted and received between the control device and said controlled device is transmitted and received wirelessly.

10. A method for controlling a controlled device by a control device via a network, said method comprising:

executing in the control device:

receiving a device ID from the controlled device;

determining whether or not the received device ID is an initial value;

generating a new device ID when the received device ID is determined to be the initial value;

requesting the controlled device to update the device ID to the new device ID;

storing, in a first storing unit, the new device ID as a device ID of the controlled device; and controlling the controlled device, using the device ID stored in the first storing unit;

wherein said determining includes determining whether or not the device ID overlaps with any device ID stored in the first storing unit when the device ID is determined not to be the initial value; and said generating includes newly generating a device ID which is not the initial value and not stored in the first storing unit if the device ID is determined to be overlapping with any device ID stored in the first storing unit, and executing in the controlled device:

storing, in a second storing unit, a device ID with an initial value;

transmitting the device ID stored in the second storing unit to the control device in response to the transmission request;

receiving an update request for the device ID from the control device;

changing the device ID stored in the second storing unit in response to the update request;

storing, in a third storing unit, attribute information of the controlled device;

receiving a transmission request for the attribute information from the control device; and transmitting the attribute information stored in the third storing unit to the control device in response to the transmission request, wherein the device ID does not include an IP address, and the network is a network in which each device does not have a device-unique address.

11. The method according to claim 10, wherein the control device requests the device ID from the controlled device.

12. The method according to claim 10, wherein the controlled device receives a request for the device ID from the control device.

13. The method according to claim 10, wherein the control device is a television and the controlled device is a digital video disc player/recorder.

14. The method according to claim 10, wherein the attribute information is information related to functions and settings provided in the controlled device which include types of tuners, recording modes, and time required for activation.

15. The method according to claim 10, wherein information transmitted and received between the control device and the controlled device is transmitted and received wirelessly.

16. A system for controlling a controlled device by a control device via a network, said system comprising:

said control device including:

an ID request unit operable to request said controlled device to transmit a device ID;

an ID reception unit operable to receive the device ID from said controlled device;

a determination unit operable to determine whether or not the received device ID is an initial value;

a generation unit operable to generate a new device ID in the case where the received device ID is determined to be the initial value;

an update request unit operable to request said controlled device to update the device ID to the new device ID;

a storing unit operable to store the new device ID as a device ID of said controlled device; and a control unit operable to control said controlled device, using the device ID stored in said storing unit;

wherein said determination unit is further operable to determine whether or not the device ID overlaps with any device ID stored in said storing unit when said determining unit determines that the device ID is not the initial value; and said generation unit is operable to newly generate a device ID which is not the initial value and not stored in said storing unit when the device ID is determined to be overlapping with any device ID stored in said storing unit; and said controlled device including:

a storing unit operable to store the device ID with the initial value;

an ID request reception unit operable to receive a transmission request for the device ID from said control device;

an ID transmission unit operable to transmit the device ID stored in said storing unit to said control device in response to the transmission request;

an update request reception unit operable to receive an update request for the device ID from said control device;

a change unit operable to change the device ID stored in said storing unit in response to the update request;

a storing unit operable to store attribute information of said controlled device;

an attribute request reception unit operable to receive a transmission request for the attribute information from said control device; and an attribute transmission unit operable to transmit the attribute information stored in said storing unit to said control device in response to the transmission request wherein the device ID does not include an IP address, and the network is a network in which each device does not have a device-unique address.

17. The control system according to claim 16, wherein said control device is a television and said controlled device is a digital video disc player/recorder.

18. The control system according to claim 16, wherein the attribute information is information related to functions and settings provided in the controlled device which include types of tuners, recording modes, and time required for activation.

19. The control system according to claim 16, wherein information transmitted and received between said control device and said controlled device is transmitted and received wirelessly.

* * * * *